US011801536B2

(12) United States Patent
Wang et al.

(10) Patent No.: US 11,801,536 B2
(45) Date of Patent: Oct. 31, 2023

(54) WASH SYSTEM FOR A GAS TURBINE ENGINE

(71) Applicant: General Electric Company, Schenectady, NY (US)

(72) Inventors: Peng Wang, Shanghai (CN); Renwei Yuan, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/336,373

(22) PCT Filed: Sep. 30, 2016

(86) PCT No.: PCT/CN2016/101135
§ 371 (c)(1),
(2) Date: Mar. 25, 2019

(87) PCT Pub. No.: WO2018/058551
PCT Pub. Date: Apr. 5, 2018

(65) Prior Publication Data
US 2020/0016633 A1 Jan. 16, 2020

(51) Int. Cl.
*B08B 3/02* (2006.01)
*B08B 9/032* (2006.01)
(Continued)

(52) U.S. Cl.
CPC .............. *B08B 3/02* (2013.01); *B08B 9/0321* (2013.01); *B64F 5/30* (2017.01); *F01D 25/002* (2013.01);
(Continued)

(58) Field of Classification Search
CPC ........... B08B 3/02; B08B 9/00; B08B 9/0321; F01D 25/002; B64F 5/30; F05D 2220/323; F05D 2230/72
See application file for complete search history.

(56) References Cited

U.S. PATENT DOCUMENTS 3,741,003 A * 6/1973 Gunkel ................. G01N 29/07
73/644
4,163,455 A 8/1979 Hebert et al.
(Continued)

FOREIGN PATENT DOCUMENTS

CN 101578143 A 11/2009
CN 205464755 U 8/2016
(Continued)

OTHER PUBLICATIONS

Abstract of JP04-323409A (Year: 1992).*
(Continued)

*Primary Examiner* — Douglas Lee
(74) *Attorney, Agent, or Firm* — Fitch, Even, Tabin & Flannery LLP

(57) ABSTRACT

A water wash system (200) for a gas turbine engine (100) having a fan (126) and a front hub (136), the front hub (136) can be rotated with the fan (126). The water wash system (200) generally includes a head unit (202) and a base assembly (204). The head unit (202) includes a mounting structure (206) and one or more wash fluid lines (208) for spraying a wash fluid into the gas turbine engine (100). The mounting structure (206) defines an inner friction surface (252) for contacting the front hub (136) of the gas turbine engine (100). Additionally, the base assembly (204) is operatively connected to the head unit (202) and is configured to press the head unit (202) towards the front hub (136) to fix the inner friction surface (252) against the front hub (136).

12 Claims, 6 Drawing Sheets

(51) Int. Cl.
  *B64F 5/30* (2017.01)
  *F01D 25/00* (2006.01)
(52) U.S. Cl.
  CPC .... *F05D 2220/323* (2013.01); *F05D 2230/72* (2013.01)

(56) References Cited

U.S. PATENT DOCUMENTS

| | | | |
|---|---|---|---|
| 4,377,018 A * | 3/1983 | Cain | A47L 11/30 15/345 |
| 5,829,461 A * | 11/1998 | Ramsey | B08B 9/0433 134/167 R |
| 5,868,860 A | 2/1999 | Asplund | |
| 7,033,979 B2 | 4/2006 | Herwig et al. | |
| 7,445,677 B1 | 11/2008 | Asplund | |
| 7,454,913 B1 | 11/2008 | Tassone et al. | |
| 3,028,936 A1 | 10/2011 | McDermott | |
| 8,109,807 B2 * | 2/2012 | Giljohann | B08B 3/02 451/11 |
| 8,216,392 B2 | 7/2012 | Giljohann et al. | |
| 3,277,647 A1 | 10/2012 | Rice et al. | |
| 9,080,460 B2 | 7/2015 | Amcoff et al. | |
| 9,138,782 B2 | 9/2015 | Dorshimer et al. | |
| 9,162,262 B2 | 10/2015 | Alvestig et al. | |
| 9,739,168 B2 | 8/2017 | Ekanayake et al. | |
| 9,926,517 B2 | 3/2018 | Tibbetts | |
| 9,932,854 B1 | 4/2018 | Tibbetts | |
| 9,951,647 B2 | 4/2018 | Rawson | |
| 9,957,066 B2 | 5/2018 | Bewlay | |
| 10,005,111 B2 | 6/2018 | Eriksen | |
| 10,018,113 B2 | 7/2018 | Bewlay | |
| 10,227,891 B2 | 3/2019 | Eriksen | |
| 10,323,539 B2 | 6/2019 | Bewlay | |
| 10,377,968 B2 | 8/2019 | Brooks | |
| 10,385,723 B2 | 8/2019 | Flynn | |
| 10,634,004 B2 | 4/2020 | Giljohann et al. | |
| 10,669,885 B2 | 6/2020 | Pecchioli et al. | |
| 10,920,181 B2 | 2/2021 | Martin et al. | |
| 11,027,317 B2 | 6/2021 | Tibbetts | |
| 11,441,446 B2 | 9/2022 | Rawson | |
| 2003/0228834 A1 * | 12/2003 | Furey | A47J 37/0786 451/358 |
| 2008/0040872 A1 * | 2/2008 | Hjerpe | B08B 3/08 15/3 |
| 2008/0178909 A1 * | 7/2008 | Alvestig | B08B 3/02 134/44 |
| 2010/0000572 A1 * | 1/2010 | Giljohann | B24C 1/003 134/198 |
| 2010/0200023 A1 * | 8/2010 | Giljohann | F01D 25/002 134/198 |
| 2010/0242994 A1 | 9/2010 | Amcoff et al. | |
| 2011/0146729 A1 | 6/2011 | Giljohann et al. | |
| 2013/0240002 A1 * | 9/2013 | Hjerpe | B08B 3/08 134/172 |
| 2014/0000656 A1 | 1/2014 | Rice et al. | |
| 2014/0034091 A1 | 2/2014 | Dorshimer et al. | |
| 2014/0260307 A1 | 9/2014 | Dorshimer et al. | |
| 2015/0159122 A1 | 6/2015 | Tibbetts | |
| 2016/0251978 A1 | 9/2016 | Sales, Jr. et al. | |
| 2017/0165721 A1 | 6/2017 | Tibbetts | |
| 2017/0167290 A1 | 6/2017 | Kulkarni | |
| 2017/0191376 A1 | 7/2017 | Eriksen | |
| 2017/0204739 A1 | 7/2017 | Rawson | |
| 2017/0254217 A1 | 9/2017 | Eriksen | |
| 2018/0149038 A1 | 5/2018 | Eriksen | |
| 2018/0155060 A1 | 6/2018 | Dauenhauer | |
| 2018/0216036 A1 | 8/2018 | Tibbetts | |
| 2018/0237163 A1 | 8/2018 | Bewlay | |
| 2018/0245477 A1 | 8/2018 | Kulkarni | |
| 2018/0258787 A1 | 9/2018 | Tibbetts | |
| 2018/0291803 A1 | 10/2018 | Belay | |
| 2018/0298781 A1 | 10/2018 | Tibbetts | |
| 2018/0313225 A1 | 11/2018 | Millhaem | |
| 2018/0355751 A1 | 12/2018 | Tibbetts | |
| 2019/0153890 A1 | 5/2019 | Eriksen | |
| 2019/0323378 A1 | 10/2019 | Tibbetts | |
| 2021/0108537 A1 | 4/2021 | Rigg et al. | |
| 2021/0317752 A1 | 10/2021 | Deja et al. | |

FOREIGN PATENT DOCUMENTS

| | | | | |
|---|---|---|---|---|
| DE | 202013005524 U1 | 5/2014 | | |
| DE | 102013202616 | 8/2014 | | |
| DE | 102013202616 A1 | 8/2014 | | |
| DE | 102013202616 B4 | 10/2015 | | |
| DE | 102015006330 | 11/2016 | | |
| DE | 102015006330 B4 | 8/2019 | | |
| EP | 2243562 A1 | 10/2010 | | |
| JP | 04323409 A * | 11/1992 | | |
| TW | 201410343 A | 3/2014 | | |
| WO | WO-2015074766 A1 * | 5/2015 | | B24C 1/003 |
| WO | WO2018/058551 A1 | 4/2018 | | |
| WO | 2020022474 | 1/2020 | | |
| WO | 2020022474 A1 | 1/2020 | | |
| WO | 2020030516 | 2/2020 | | |
| WO | 2020030516 A1 | 2/2020 | | |

OTHER PUBLICATIONS

Machine translation of WO2015/074766A1 (Year: 2015).*
New World Encyclopedia webpage for "Ball bearing" archived Jan. 3, 2015 from https://web.archive.org/web/20150103001236/https://www.newworldencyclopedia.org/entry/Ball_bearing (Year: 2015).*
European Search Report Corresponding to Application No. 16917301 dated Mar. 12, 2020.
European Office Action Corresponding to Application No. 16917301 dated Mar. 18, 2020.
PCT International Search Report PCT/CN2016/101135 dated Jun. 9, 2017.
AviationPros: <http://www.aviationpros.com/press_release/12183391/cycleanr-engine-wash-conquers-the-fifth-continent>, Mar. 17, 2016, 5 pages.
Google Search Query: <https://www.google.com/search?q=engine+water+wash+tool&safe=active&biw=1301&bih=572&source=lnms&tbm=isch&sa=X&ved=0ahUKEwjJ7oyTI8PMAhXCICwKHYvWCjcQ_AUIBygC#safe=active&tbm=isch&q=aircraft+engine+water+wash+tool&imgrc=9dBB6vW13FWc2M%3A> (run prior to Mar. 25, 2019; the results from this search query run on Sep. 7, 2022 is submitted), 12 pages.
Lufthansa Technik: <http://r1.aviationpros.com/files/base/CAVC/image/2010/01/16x9/640x360/cycleanenginewash_10137845.jpg>, 2010, 1 page.
PPRuNE Blog: <https://www.pprune.org/tech-log/478622-engine-compressor-wash.html>, 2012, 9 pages.
Spray Water Wash, prior to Mar. 25, 2019, 1 page.
The Ecopower® System, prior to Mar. 25, 2019, 1 page.

* cited by examiner

WASH SYSTEM FOR A GAS TURBINE ENGINE

FIELD OF THE INVENTION

The present subject matter relates generally to a wash system for a gas turbine engine.

BACKGROUND OF THE INVENTION

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

During operation, a substantial amount of air is ingested by such gas turbine engines. However, such air may contain foreign particles. A majority of the foreign particles will follow a gas path through the engine and exit with the exhaust gases. However, at least certain of these particles may stick to certain components within the gas turbine engine's gas path, potentially changing aerodynamic properties of the engine and reducing engine performance.

In order to remove such foreign particles from within the gas path of the gas turbine engine, water or other liquids may be directed towards an inlet of the gas turbine engine, while the core engine is cranked using, e.g., a starter motor. Such movement may enhance the wash results by mechanical engagement between the water and components. Additionally, such rotation may also urge the water through the engine and out the exhaust section.

However, it can be difficult to direct the wash liquid into the core engine through the fan when the fan is operating. Accordingly, a wash system capable of more efficiently spraying wash liquid into the core engine despite a rotation of the fan would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a water wash system for a gas turbine engine is provided. The gas turbine engine includes a fan and a front hub rotatable with the fan. The water wash system includes a head unit having a mounting structure and one or more wash fluid lines for spraying a wash fluid into the gas turbine engine. The mounting structure defines an inner friction surface for contacting the front hub of the gas turbine engine. The water wash system additionally includes a base assembly operably connected to the head unit, the base assembly configured to press the head unit towards the front hub to fix the inner friction surface against the front hub.

In an exemplary aspect of the present disclosure, a method for washing a gas turbine engine is provided. The gas turbine engine includes a fan and a front hub rotatable with the fan. The method includes positioning a head unit of a water wash system adjacent to the front hub of the gas turbine engine. The method also includes pressing the head unit onto the front hub of the gas turbine engine with a base assembly of the water wash system to fix an inner friction surface of the head unit against the front hub of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
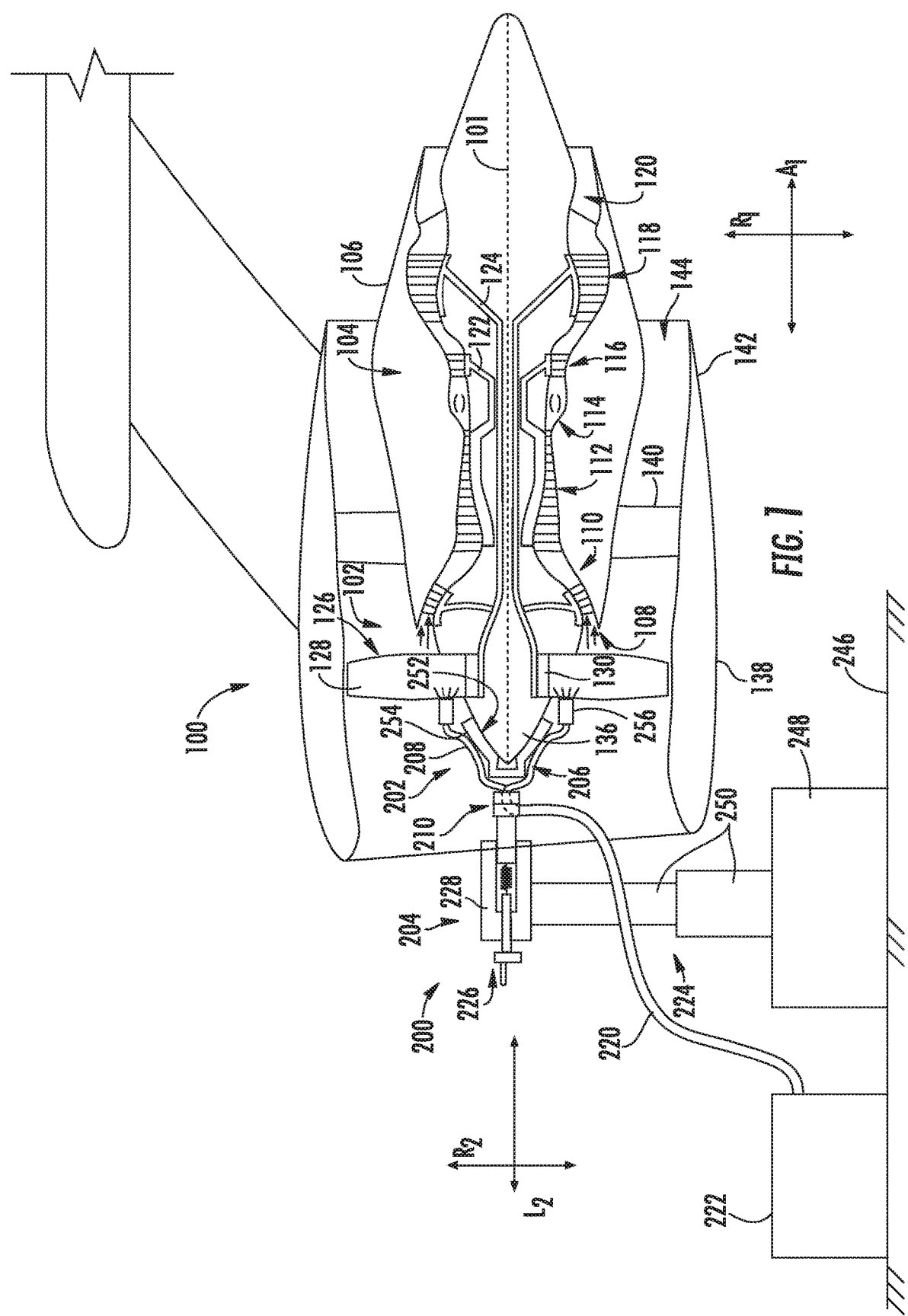
FIG. 1 is a schematic, cross-sectional view of a water wash system in accordance with an exemplary aspect of the present disclosure operable with an exemplary gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 provides a wash water system for a gas turbine engine in accordance with an exemplary embodiment of the present disclosure. For the embodiment depicted, the gas turbine engine with which the wash water system is operable is configured as a turbofan jet engine, herein referred to as "turbofan 100." As shown in FIG. 1, the exemplary turbofan 100 defines an axial direction A1 (extending parallel to a longitudinal centerline 101 provided for reference), a radial direction R1, and a circumferential direction C1 (extending about the axial direction A1; not shown). As will be appreciated, however, in other embodiments of the present disclosure, the gas turbine engine may be configured in any other suitable manner. For example, aspects of the present disclosure may instead be utilized with any other suitable turbofan engine, turboprop engine, etc.

In general, the turbofan 100 includes a fan section 102 and a core turbine engine 104 disposed downstream from the fan section 102. The exemplary core turbine engine 104 depicted generally includes a substantially tubular outer casing 106 that defines an annular inlet 108. The outer casing 106 encases, in serial flow relationship, a compressor section including a second, booster or low pressure (LP) compressor 110 and a first, high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A first, high pressure (HP) shaft or spool 122 drivingly connects the HP turbine 116 to the HP compressor 112. A second, low pressure (LP) shaft or spool 124 drivingly connects the LP turbine 118 to the LP compressor 110.

For the embodiment depicted, the fan section 102 includes a fan 126 having a plurality of fan blades 128 coupled to a disk 130 in a spaced apart manner. As depicted, the fan blades 128 extend outwardly from disk 130 generally along the radial direction R1. In certain exemplary aspects, the fan 126 may be a variable pitch fan, such that each of the plurality of fan blades 128 are rotatable relative to the disk 130 about a pitch axis, by virtue of the plurality of fan blades 128 being operatively coupled to an actuation member.

Referring still to the exemplary embodiment of FIG. 1, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Moreover, the fan blades 128, disk 130, and front hub 136 are together rotatable about the longitudinal axis 101 directly by the LP spool 124. Accordingly, for the embodiment depicted, the turbofan engine 100 may be referred to as a "direct drive" turbofan engine. However, in other embodiments, the turbofan engine 100 may additionally include a reduction gearbox for driving the fan 126 at a reduced rotational speed relative to the LP spool 124.

Referring now particularly to the water wash system 200 depicted in FIG. 1, the water wash system 200 is configured to provide a flow of wash fluid into the core turbine engine 104 to remove particles which may have accumulated during operation of the turbofan engine 100. The wash fluid may be any suitable combination of water, detergent, foam, or any other fluid capable of washing or otherwise removing particles from within the gas turbine engine. Accordingly, although referred to as a "water wash system", in the embodiments described herein, the system 200 may utilize any suitable wash fluid.

The exemplary water wash system 200 generally includes a head unit 202 and a base assembly 204. As will be described in greater detail below, the head unit 202 generally includes a mounting structure 206 and one or more wash fluid lines 208 for spraying a wash fluid into the turbofan engine 100. Additionally, the base assembly 204 is operably connected to the head unit 202 and configured to press the head unit 202 towards the front hub 136 of the gas turbine engine (e.g., the turbofan engine 100).

Figure 2:
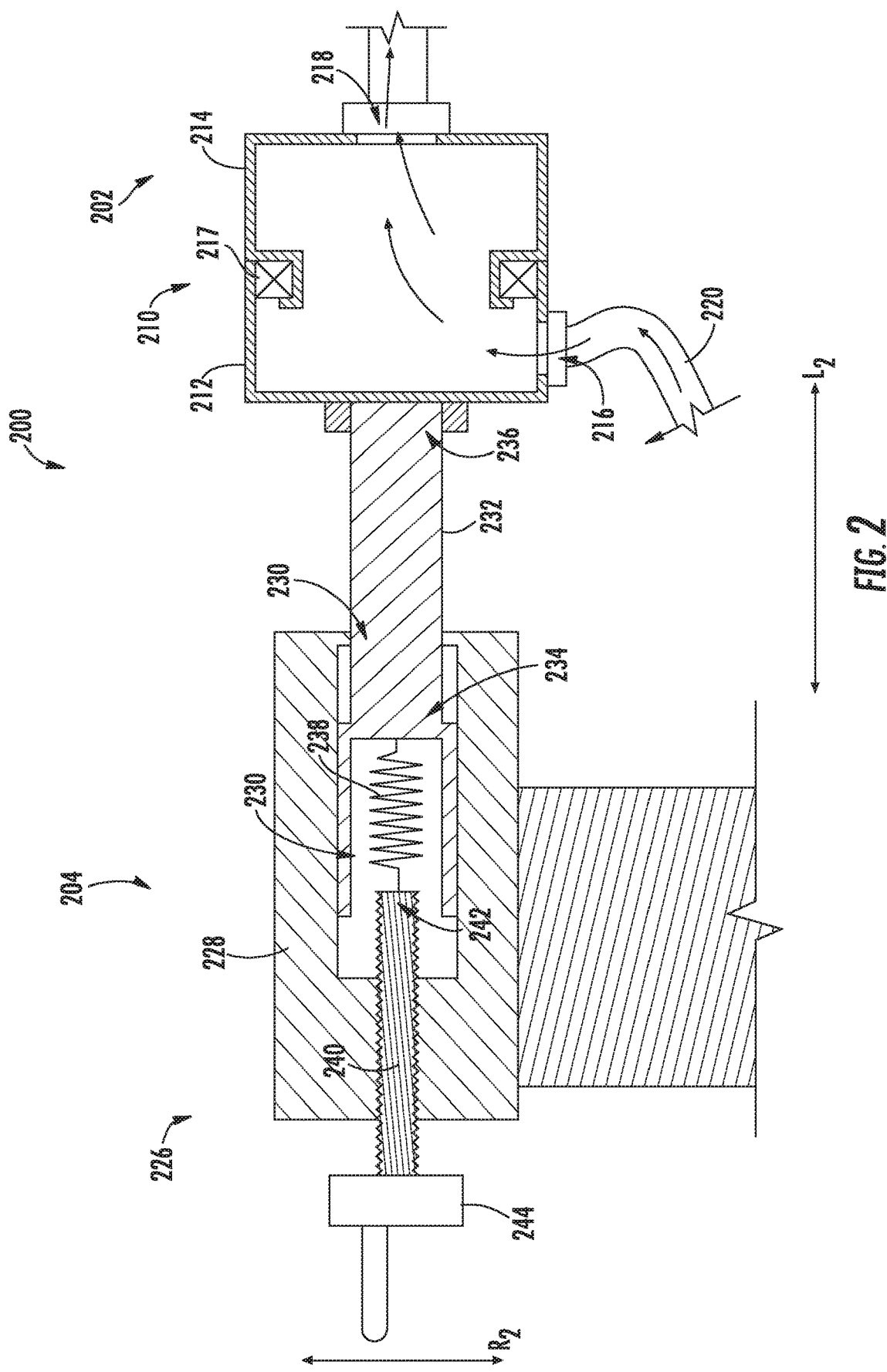
FIG. 2 is a close-up, schematic, cross-sectional view of a portion of the exemplary water wash system of FIG. 1.

More specifically, referring now also to FIG. 2, providing a close-up, cross-sectional view of a portion of the water wash system 200 of FIG. 1, the head unit 202 comprises a rotary connector 210. For the embodiment depicted, the rotary connector 210 generally includes a fixed member 212 and a spinning member 214. The fixed member 212 is attached to the base assembly 204, as described more fully below, to allow the head unit 202 to rotate relative to the base assembly 204. More specifically, as will be described in greater detail below, the head unit 202 is configured to be fixed to the front hub 136 of the gas turbine engine during operation of the water wash system 200, such that the head unit 202 rotates at the same angular velocity as the front hub 136 during operation of the water wash system 200. Notably, for the embodiment depicted, the spinning member 214 is rotatably coupled to the fixed member 212 by virtue of a bearing assembly 217. The bearing assembly 217 may be, e.g., a ball bearing assembly, or any other suitable bearing assembly.

As is also depicted, for the embodiment depicted, the rotary connector 210 defines an inlet 216 for receiving a pressurized wash fluid and an outlet 218. More specifically, rotary connector 210 is configured for connection to a supply fluid line 220 of the water wash system 200 at the inlet 216. As will be appreciated, the supply fluid line 220 is fluidly connected to a pressurized fluid source 222 of the water wash system 200. Moreover, for the embodiment depicted, the outlet 218 is fluidly connected to the one or more wash fluid lines 208 of the head unit 202 for providing the pressurized wash fluid to the one or more wash fluid lines 208 of the head unit 202. Accordingly, the rotary connector 210 is configured to receive pressurized wash fluid from a fixed frame of reference and supply such pressurized wash fluid to a rotating frame of reference.

Additionally, the exemplary base assembly 204 depicted generally includes a stand 224 and a press unit 226. The stand 224 generally provides support for the press unit 226, and the press unit 226 provides the head unit 202 with an amount of force during operation of the water wash system 200. More particularly, the press unit 226 defines a longitudinal direction L2 and a circumferential direction C2 (i.e., a direction extending about the longitudinal direction L2; see FIG. 3). As will be appreciated from, e.g., the description below, the press unit 226 is configured to provide the head unit 202 an amount of force along the longitudinal direction L2 towards the front hub 136 of the turbofan engine 100.

For the embodiment depicted, the press unit 226 generally includes a housing 228 extending along the longitudinal direction L2 and defining an opening 230, the opening 230 also extending along the longitudinal direction L2. The press unit 226 further includes a rod 232 extending between a first end 234 and a second end 236. The rod 232 is slidably received (along the longitudinal direction L2) within the opening 230, such that the first end 234 of the rod 232 is positioned completely within the opening 230 of the housing 228. The press unit 226 further includes an elastic member 238 positioned within the opening 230 for providing a force to the rod 232. More particularly, for the embodiment depicted, the elastic member 238 is configured as a spring.

The exemplary press unit 226 depicted is further provided with a means for adjusting an amount of force supplied by the press unit 226 to the head unit 202. For the embodiment depicted, the means for adjusting the amount of pressure includes an adjustment bolt 240 extending through the housing 228 and into the opening 230 defined by the housing 228. A distal end 242 of the adjustment bolt 240 is operable with the elastic member 238 (i.e., the spring), such that the elastic member 238 extends between the distal end 242 of the adjustment bolt 240 and the first end 234 of the rod 232 (and to the head unit 202). A head 244 of the adjustment bolt 240 may be rotated to increase or decrease the amount of compression force on the elastic member 238, and thus amount of force applied to the rod 232. Accordingly, as will be appreciated, the adjustment bolt 240 is, for the embodiment depicted, threadably received through the housing 228.

Notably, in other exemplary embodiments, any other suitable means for adjusting an amount of pressure supplied by the press unit 226 to the head unit 202 may be provided. For example, in other embodiments, the press unit 226 may not include the elastic member 238, and instead, the adjustment bolt may extend directly to the rod 232.

Referring still to FIGS. 1 and 2, for the embodiment depicted, the base assembly 204 is operably connected to the head unit 202 through the rod 232. More specifically, the second end 236 of the rod 232 is rigidly attached to the fixed member 212 of the rotary connector 210 of the head unit 202. In certain embodiments, the second end 236 of the rod 232 may be permanently attached to the fixed member 212 of the rotary connector 210, e.g., by welding or by being formed integrally. Alternatively, however, in other embodiments, the second end 236 of the rod 232 may be removably attached to the fixed member 212 of the rotary connector 210 using a reversible attachment configuration (e.g., a screw connection).

Referring back particularly to FIG. 1, for the embodiment depicted, the stand 224 of the base assembly 204 is configured to interact with a surrounding terrain 246 (e.g., a water wash car/cart, a runway, or other ground structure on which an airplane with which the turbofan engine 100 operates is positioned). More particularly, the stand 224 includes a support portion 248 for contacting the surrounding terrain 246 and an adjustable shaft 250 extending between the support portion 248 and the press unit 226. For the embodiment depicted, the adjustable shaft 250 is a telescoping shaft in which at least a portion may be nested within a remaining portion. However, in other embodiments, the adjustable shaft 250 may be any other suitable configuration allowing for adjustments to made to adjust an effective height of the press unit 226 (i.e., an effective distance along a vertical direction of the press unit 226 relative to the surrounding terrain 246).

Additionally, referring particularly to the head unit 202 of the exemplary water wash system 200, the mounting structure 206 defines an inner friction surface 252 for contacting the front hub 136 of the gas turbine engine, as is depicted in FIG. 1. More specifically, the mounting structure 206 includes a mounting pad 254 defining the inner friction surface 252. The mounting pad 254 is formed of a material having a relatively high coefficient of friction. For example, in at least certain embodiments, the mounting pad 254 may be formed of a material having a coefficient of friction greater than about 0.7. More specifically, in certain exemplary embodiments the mounting pad 254 may be formed of a material having a coefficient of friction greater than about 0.8. For example, in at least certain exemplary embodiments, the mounting pad 254 may be formed of a material including at least one of rubber or silicone components. However, in other embodiments, the mounting pad 254 may be formed of any other suitable material having a desired coefficient of friction.

Further, for the embodiment depicted, the mounting pad 254, or more specifically, the inner friction surface 252, defines a shape configured to match a shape of the front hub 136. For the embodiment depicted, such a shape is a substantially frescoconical shape. With such a configuration, the mounting pad 254 may have a relatively large amount of surface area contact with the front hub 136 of the gas turbine engine.

Accordingly, when configured in accordance with one or more of the exemplary embodiments described herein, when the base assembly 204 presses the head unit 202 towards the front hub 136, the inner friction surface 252 is fixed against the front hub 136. More specifically, a head unit 202 of the water wash system 200 configured in accordance with one or more the above embodiments may allow the head unit 202 of the water wash system 200 to effectively be mounted to the front hub 136 of the gas turbine engine without requiring any bolts, straps, or other mechanical attachment devices. Instead, the head unit 202 of the exemplary water wash system 200 may be mounted to the front hub 136 of the gas turbine engine solely using friction.

It should be appreciated, that although for the embodiment depicted, the mounting structure 206 is depicted as simply including the mounting pad 254, in other embodiments, any other suitable structure may be included with the mounting structure 206. For example, in certain embodiments, the head unit 202 may include one or more rigid frame members with the mounting structure 206, or the mounting pad 254 may include a substantially rigid outer layer and an inner layer defining the inner friction surface 252. Additionally, or alternatively, the plurality of wash fluid lines 208 may be configured as substantially rigid wash fluid lines 208 to provide the necessary rigidity to the head unit 202. In still other embodiments, the wash fluid lines 208 may be configured as substantially rigid wash fluid lines, and in addition, the mounting structure 206 may provide substantially rigid support members providing additional support for the wash fluid lines 208.

Figure 3:
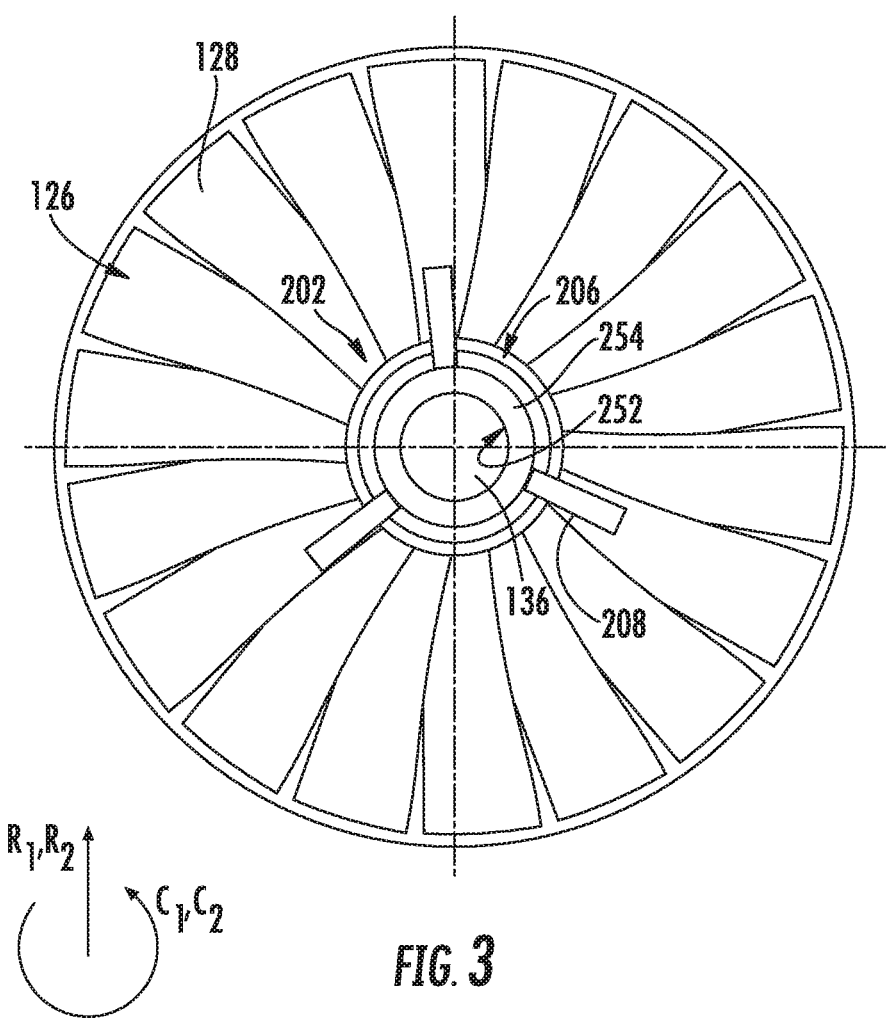
FIG. 3 is a schematic, front view of a portion of the exemplary water wash system of FIG. 1.

Referring still to FIG. 1, and now also to FIG. 3, providing an isolated, front view of the exemplary head unit 202 attached to the front hub 136 of the turbofan engine 100, the exemplary head unit 202 is configured to rotate with the fan 126 of the turbofan engine 100 during wash operations to effectively provide wash fluid to the core turbine engine 104. For the embodiment depicted, the head unit 202 defines a longitudinal direction L2, radial direction R2, and a circumferential direction C2. The longitudinal, radial, and circumferential directions L2, R2, C2 of the head unit 202 may be aligned with the longitudinal, radial, and circumferential directions L2, R2, C2 of the base assembly 204 described above.

As previously discussed, the exemplary head unit 202 includes one or more wash fluid lines 208 for spraying a wash fluid into the turbofan engine 100. Specifically, for the embodiment depicted, the one or more wash fluid lines 208 includes at least three wash fluid lines 208 spaced along the circumferential direction C2. For the embodiment depicted, each of the three wash fluid lines 208 are spaced substantially evenly along the circumferential direction C2. Additionally, the three wash fluid lines 208 each include a nozzle 256 at a distal end oriented to spray a wash fluid through adjacent fan blades 128. It should be appreciated, that as used herein, terms of approximation, such as "about" or "substantially," refer to being within a 10% margin of error. Moreover, although for the embodiment depicted each of the plurality of wash fluid lines 208 do not extend through adjacent fan blades 128, in other embodiments, one or more of the plurality of wash fluid lines 208 may extend at least partially between adjacent fan blades 128, or through adjacent fan blades 128.

Furthermore, as discussed above with reference to FIGS. 1 and 2, when mounted, the head unit 202 is fixed to the front hub 136 of the gas turbine engine, such that the head unit 202 rotates at the same angular velocity as the hub 136 during washing operations. Further, as the hub 136 is rotatable with the fan 126, mounting the head unit 202 to the hub 136 may allow the plurality of wash fluid lines 208 to spray wash fluid substantially continuously through adjacent fan blades 128, such that the head unit 202 may substantially continuously and directly spray the wash fluid into the core turbine engine 104 during operation of the water wash system 200. Notably, during such operation of the water wash system 200, the fan 126 and other components of the gas turbine engine may be rotated by, e.g., a starter motor (not shown), such that without an ability to substantially continuously spray the wash fluid through adjacent fan blades 128 of the fan 126, the wash fluid would less efficiently reach the core turbine engine 104, and instead may be dispersed through, e.g., the bypass airflow passage 144 of the turbofan engine 100.

It should be appreciated, however, that the exemplary water wash system 200 described above with reference to FIGS. 1 through 3 is provided by way of example only. In other exemplary embodiments, the water wash system 200 may have any other suitable configuration. For example, in other embodiments the head unit 202 may include any other suitable number of wash fluid lines 208, the rotary connector 210 of the head unit 202 may be configured in any other suitable manner, and/or the inner friction surface 252/mounting pad 254 may have any other suitable shape for being fixed to the front hub 136 of the gas turbine engine.

Figure 4:
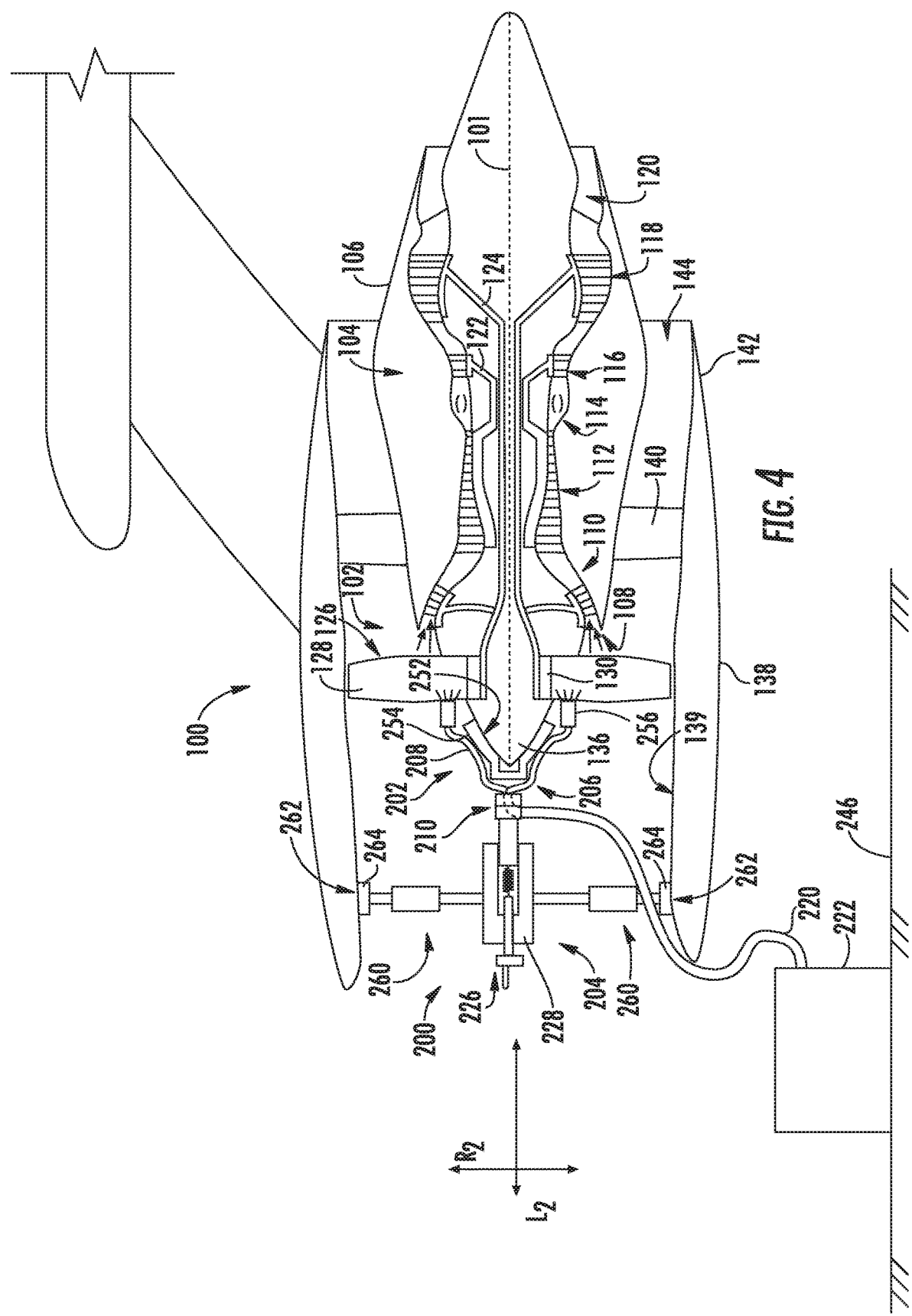
FIG. 4 is a schematic, cross-sectional view of the water wash system in accordance with another exemplary aspect of the present disclosure operable with an exemplary gas turbine engine.

Further, in still other embodiments, the stand 224 of the base assembly 204 may be configured in any other suitable manner. For example, referring now to FIGS. 4 and 5, a water wash system 200 including a base assembly 204 having a stand 224 in accordance with another embodiment of the present disclosure is provided. The exemplary water wash system 200 of FIGS. 4 and 5 may in other respects be configured in substantially the same manner as exemplary water wash system 200 described above with reference to FIGS. 1 through 3.

For example, the exemplary water wash system 200 generally includes a head unit 202 having a mounting structure 206 defining an inner friction surface 252 for contacting the front hub 136 of the gas turbine engine. In addition, the head unit 202 includes one or more wash fluid lines 208. Additionally, the water wash system 200 includes a base assembly 204 operably connected to the head unit 202 and configured to press the head unit 202 towards the hub 136 to fix the inner friction surface 252 of the mounting structure 206 against the front hub 136. Moreover, the base assembly 204 includes a stand 224 and a press unit 226, wherein the press unit 226 provides the head unit 202 an amount of force during operation.

However, for the embodiment depicted, the stand 224 is not configured to interact with a surrounding terrain 246. Instead, the stand 224 includes a plurality of adjustable tension rods 260. Each of the plurality of adjustable tension rods 260 defines a distal end 262 (relative to a housing 228 of the press unit 226), with a friction pad 264 located at the distal end 262. Each of the friction pads 264 are configured for contacting an interior surface 139 of an outer nacelle 138 of the turbofan engine 100. Additionally, each of the tension rods 260 are extendable along a length (e.g., along the radial direction R2), such that the tension rods 260 may press their respective friction pads 264 against the interior surface 139 of the outer nacelle 138 and fix itself (and the press unit 226) in position.

Figure 5:
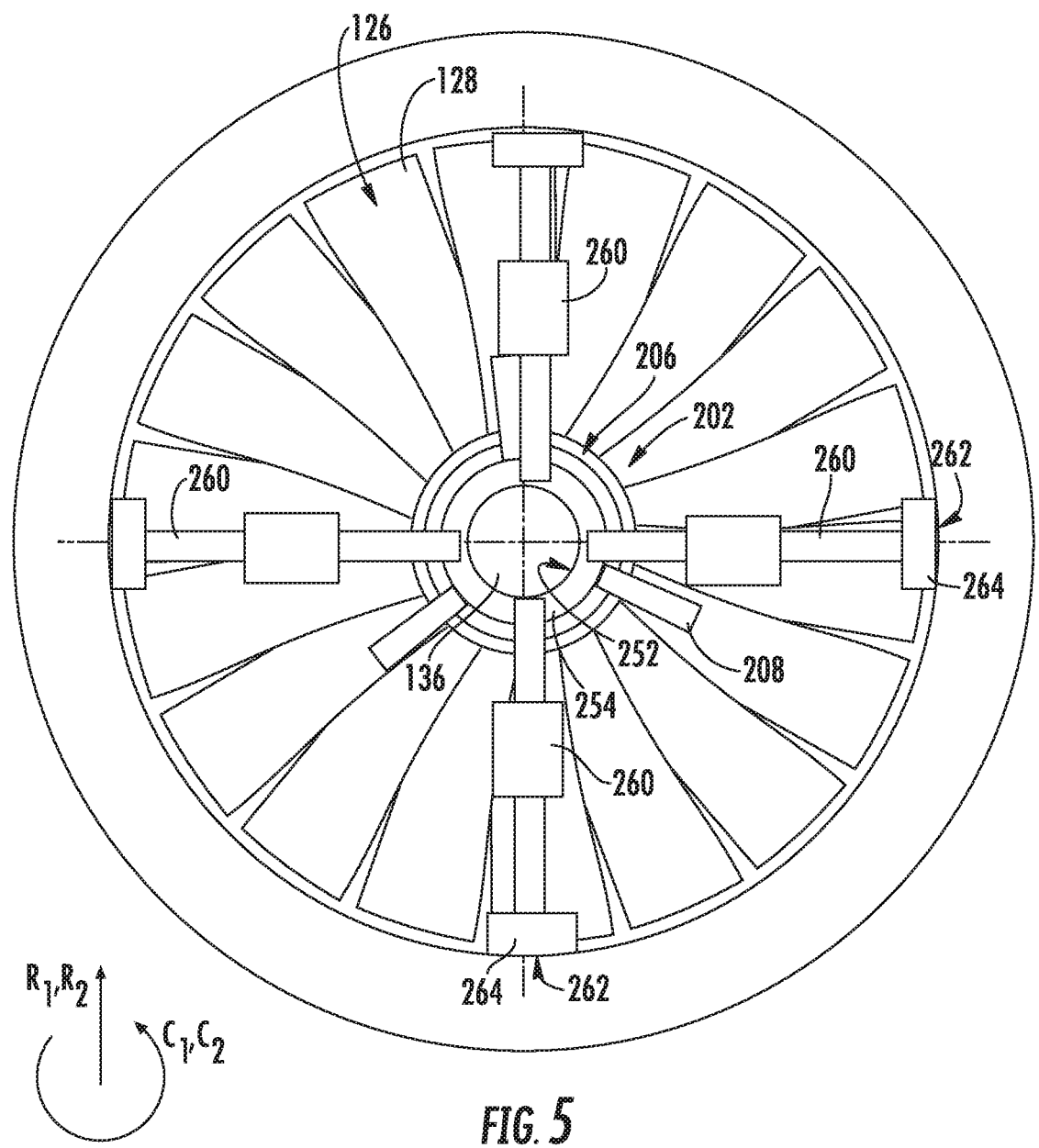
FIG. 5 is a schematic, front view of a portion of the exemplary water wash system of FIG. 4.

Referring particularly to FIG. 5, the exemplary tension rods 260 are spaced substantially equally along a circumferential direction C2. More specifically, the exemplary stand 224 depicted includes four tension rods 260, with each tension rod 260 spaced approximately ninety degrees)(90° apart from an adjacent tension rod 260. It should be appreciated, however, that in other embodiments, the exemplary stand 224 may include any other suitable number of tension rods 260. For example, in other embodiments, the stand 224 may include two tension rods 260, three tension rods 260, or any other suitable number of tension rods 260.

Figure 6:
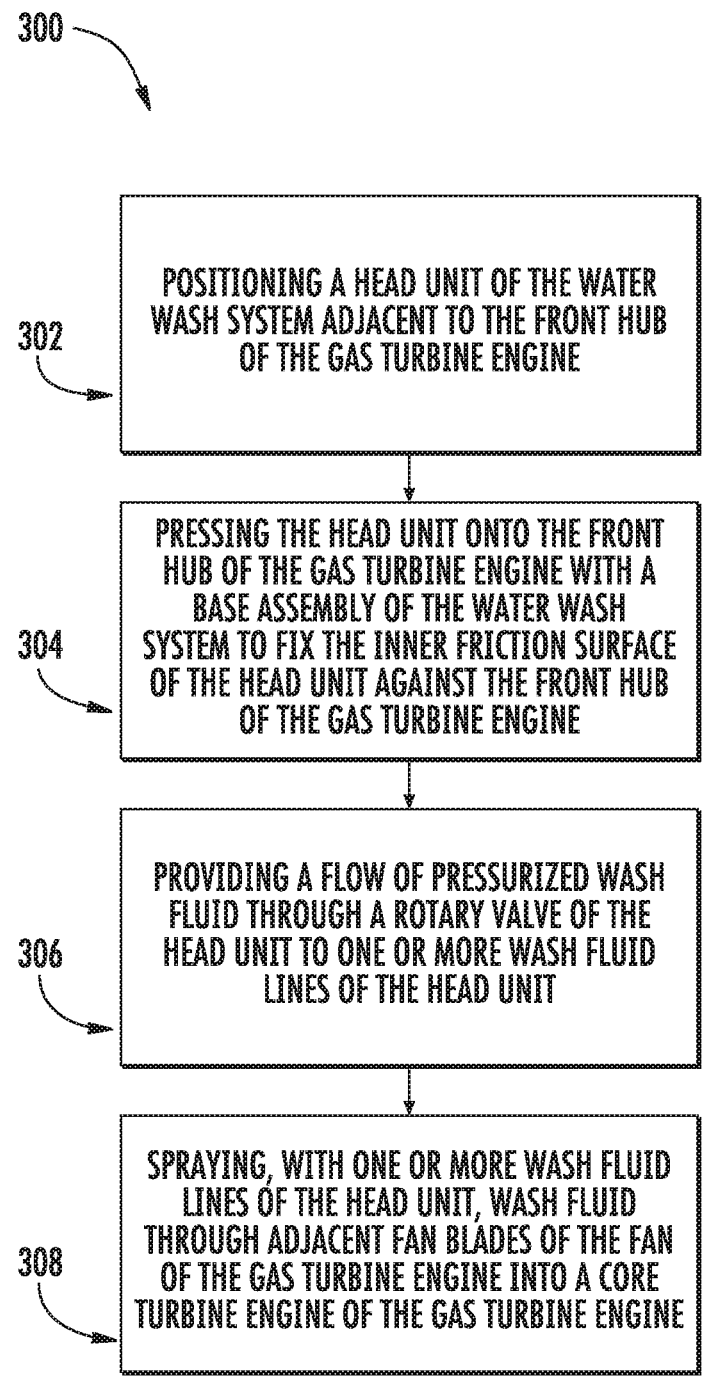
FIG. 6 is a flow diagram of a method for washing a gas turbine engine in accordance with an exemplary aspect of the present disclosure.

Referring now to FIG. 6, a method (300) for washing a gas turbine engine in accordance with an exemplary aspect of the present disclosure is provided. The gas turbine engine may include a fan and a front hub rotatable with the fan. Additionally, the exemplary method (300) may utilize a water wash system configured in accordance with one or more of the exemplary embodiments described above with reference to FIGS. 1 through 5.

The exemplary method (300) generally includes at (302) positioning a head unit of the water wash system adjacent to the front hub of the gas turbine engine. In at least certain exemplary aspects, positioning the head unit of the water wash system adjacent to the front hub at (302) may include adjusting a height of a base assembly of the water wash system (see, e.g., the embodiment of FIGS. 1 and 2). Alternatively, however, in other exemplary aspects, positioning the head unit of the water wash system adjacent to the front hub at (302) may include fixing the base assembly in position using a plurality of tension rods. The plurality of tension rods may be pressed against an inside surface of an outer nacelle of the gas turbine engine being washed (see, e.g., the embodiment of FIGS. 4 and 5).

Referring still to FIG. 6, the exemplary method (300) additionally includes at (304) pressing the head unit onto the front hub of the gas turbine engine with a base assembly of the water wash system to fix the inner friction surface of the head unit against the front hub of the gas turbine engine. As discussed above, the inner friction surface (and a mounting pad defining the inner friction surface) may define a minimum contact surface area and may be formed of a material having a minimum coefficient of friction, such that when pressed against the front hub, friction prevents any substantial relative movement between the head unit and the front hub of the gas turbine engine.

Moreover, as is also depicted for the exemplary aspect of FIG. 6, the exemplary method (300) includes at (306) providing a flow of pressurized wash fluid through a rotary connector of the head unit to one or more wash fluid lines of the head unit. Additionally, at (308), the exemplary method (300) includes spraying, with one or more wash fluid lines of the head unit, wash fluid through adjacent fan blades of the fan of the gas turbine engine into a core turbine engine of the gas turbine engine. Notably, in at least certain exemplary aspects, spraying at (308) may include substantially continuously spraying a wash fluid through adjacent fan blades of the gas turbine engine into the core turbine engine of the gas turbine engine.

A method in accordance with an exemplary aspect of FIG. 6 may provide for a more efficient cleaning washing of the gas turbine engine, by providing a more continuous, uninterrupted flow of wash fluid into the core turbine engine during washing operations. Additionally, a method in accordance with an exemplary aspect of FIG. 6 may allow for an easier and quicker set up by not requiring any mechanical fasteners between the head unit and the front hub of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

COMPONENT LIST

| Reference Character | Component |
| --- | --- |
| 100 | Turbofan Jet Engine |
| 101 | Longitudinal or Axial Centerline |
| 102 | Fan Section |
| 104 | Core Turbine Engine |
| 106 | Outer Casing |
| 108 | Inlet |
| 110 | Low Pressure Compressor |
| 112 | High Pressure Compressor |
| 114 | Combustion Section |
| 116 | High Pressure Turbine |
| 118 | Low Pressure Turbine |
| 120 | Jet Exhaust Section |
| 122 | High Pressure Shaft/Spool |
| 124 | Low Pressure Shaft/Spool |
| 126 | Fan |
| 128 | Blades |
| 130 | Disc |
| 136 | Front hub |
| 138 | Fan Casing or Nacelle |
| 140 | Outlet Guide Vane |
| 142 | Downstream Section |
| 144 | Bypass Airflow Passage |
| 200 | Water wash system |
| 202 | Head unit |
| 204 | Base assembly |
| 206 | Mounting frame |
| 208 | Wash fluid lines |
| 210 | Rotary valve |
| 212 | Fixed member |
| 214 | Spinning member |
| 216 | Inlet to rotary valve |
| 218 | Outlet a rotary valve |
| 220 | Supply line |
| 222 | Pressurized fluid source |
| 224 | Stand |
| 226 | Press unit |
| 228 | Housing |
| 230 | Opening of housing |
| 232 | Rod |
| 234 | 1$^{st}$ end of rod |
| 236 | 2$^{nd}$ end of rod |

-continued

COMPONENT LIST

| Reference Character | Component |
| --- | --- |
| 238 | Elastic member |
| 240 | Adjustment bolt |
| 242 | Distal end |
| 244 | Head of bolt |
| 246 | Surrounding terrain |
| 248 | Support portion of stand |
| 250 | Adjustable shaft of stand |
| 252 | Inner friction surface |
| 254 | Mounting pad |
| 256 | Nozzle |
| 260 | Tension rods |
| 262 | Distal end of tension rod |
| 264 | Friction pad |
| 139 | Inner surface of the outer nacelle |

What is claimed is:

1. A water wash system for a gas turbine engine comprising a fan and a front hub rotatable with the fan, the water wash system comprising:
a head unit comprising a mounting structure and one or more wash fluid lines for spraying a wash fluid into a gas turbine engine, the mounting structure defining an inner friction surface for contacting a front hub of the gas turbine engine;
a press unit operably connected to the head unit and generating a press unit axial force that presses the inner friction surface into constant engagement with the front hub such that only a friction engagement between the head unit and the front hub causes the head unit to rotate at a same angular velocity as the front hub, the press unit including an actuator to increase or decrease the press unit axial force generated by the press unit; and
a base assembly supporting the head unit and the press unit, the base assembly providing a base assembly axial force for the head unit that is independent of the press unit axial force generated by the press unit, the base assembly axial force being applied and adjustable by the actuator while the base assembly is stationary, the press unit axial force being along a rotational axis of the front rotatable hub, and the press unit being intermediate the base assembly and the head unit;
wherein the head unit comprises a rotary connector, wherein the rotary connector comprises a fixed member and a spinning member, wherein the spinning member is rotatably coupled to the fixed member so as to rotate freely relative to the fixed member, and wherein the fixed member is attached to the press unit to allow the head unit to freely rotate relative to the base assembly, the spinning member being shaped to be coupled to the front hub to be driven by rotation of the front hub by only the friction engagement.

2. The water wash system of claim 1, wherein the inner friction surface defines a frustoconical shape configured to match a shape of the front hub.

3. The water wash system of claim 1, wherein the mounting structure comprises a mounting pad defining the inner friction surface, wherein the mounting pad is comprised of at least one of a rubber material or a silicone material.

4. The water wash system of claim 1, wherein the rotary connector defines an inlet for receiving a pressurized wash fluid and an outlet, and wherein the outlet is fluidly connected to the one or more wash fluid lines for providing the pressurized wash fluid to the one or more wash fluid lines.

5. The water wash system of claim 1, wherein the head unit defines a circumferential direction, and wherein the one or more wash fluid lines includes a plurality of wash fluid lines spaced along the circumferential direction.

6. The water wash system of claim 1, wherein the press unit comprises a housing extending along a longitudinal direction and a rod, wherein the housing defines an opening along the longitudinal direction, wherein the rod is slidably received within the opening, and wherein the press unit further comprises an elastic member positioned within the opening for providing at least a portion of the press unit axial force to the rod.

7. The water wash system of claim 6, wherein the base assembly is operably connected to the head unit through the rod.

8. The water wash system of claim 1, wherein the base assembly comprises a support portion for contacting a surrounding terrain and an adjustable shaft, wherein the adjustable shaft is extendable from the support portion.

9. The water wash system of claim 1, wherein the base assembly comprises a plurality of adjustable tension rods, wherein each of the plurality of adjustable tension rods comprises a friction pad located at a distal end for contacting an interior surface of an outer nacelle of the gas turbine engine.

10. The water wash system of claim 9, wherein the press unit defines a circumferential direction, and wherein each of the plurality of adjustable tension rods are equally spaced along the circumferential direction.

11. The water wash system of claim 1, wherein the spinning member is rotatably coupled to the fixed member via a bearing assembly.

12. The water wash system of claim 1, wherein the inner friction surface is formed of a first material and the front hub includes an outer surface of a second material such that when the first material is pressed against the second material a coefficient of friction is greater than about 0.7.

* * * * *